(12) United States Patent
Blomberg

(10) Patent No.: US 8,995,044 B2
(45) Date of Patent: Mar. 31, 2015

(54) MICROMECHANICAL TUNABLE FABRY-PEROT INTERFEROMETER AND A METHOD FOR PRODUCING THE SAME

(75) Inventor: Martti Blomberg, Espoo (FI)

(73) Assignee: Teknologian Tutkimuskeskus VTT Oy, VTT (FI)

( * ) Notice: Subject to any disclaimer, the term of this patent is extended or adjusted under 35 U.S.C. 154(b) by 177 days.

(21) Appl. No.: 13/498,143

(22) PCT Filed: Sep. 24, 2010

(86) PCT No.: PCT/FI2010/050739
§ 371 (c)(1),
(2), (4) Date: Mar. 25, 2012

(87) PCT Pub. No.: WO2011/036346
PCT Pub. Date: Mar. 31, 2011

(65) Prior Publication Data
US 2012/0181647 A1      Jul. 19, 2012

(30) Foreign Application Priority Data

Sep. 24, 2009   (FI) .................................. 20095976

(51) Int. Cl.
| G02B 26/00 | (2006.01) |
| G02F 1/03 | (2006.01) |
| G02B 27/00 | (2006.01) |
| G01B 9/02 | (2006.01) |
| G02B 6/12 | (2006.01) |
| G02B 6/26 | (2006.01) |
| G02B 6/42 | (2006.01) |
| G01J 3/26 | (2006.01) |
| G01J 3/02 | (2006.01) |

(52) U.S. Cl.
CPC ..... *G01J 3/26* (2013.01); *G01J 3/02* (2013.01); *G01J 3/021* (2013.01); *G01J 3/0243* (2013.01); *G02B 26/001* (2013.01)
USPC ........... 359/290; 359/260; 359/578; 356/454; 356/519; 385/14; 385/32

(58) Field of Classification Search
USPC ...................... 359/260, 290, 578; 385/14, 32; 356/454, 519
See application file for complete search history.

(56) References Cited

U.S. PATENT DOCUMENTS

| 6,078,395 A * | 6/2000 | Jourdain et al. ............. 356/519 |
| 2005/0018331 A1 | 1/2005 | Pautet et al. |
| 2008/0035846 A1 | 2/2008 | Talghader et al. |
| 2008/0123100 A1 * | 5/2008 | Suzuki et al. ................ 356/454 |

FOREIGN PATENT DOCUMENTS

| EP | 0668490 | 8/1995 |
| EP | 0693683 | 1/1996 |
| JP | 2009204381 | 9/2009 |

* cited by examiner

Primary Examiner — Scott J Sugarman
Assistant Examiner — Mustak Choudhury
(74) Attorney, Agent, or Firm — Mark M. Friedman

(57) ABSTRACT

The invention relates to controllable Fabry-Perot interferometers which are produced with micromechanical (MEMS) technology. Micromechanical interferometers of the prior art have a disadvantage of significantly attenuating infrared radiation. In the inventive solution there is a gap in at least one mirror, serving as a layer of the mirror. The other layers of the mirrors can be made of polycrystalline silicon, which has a negligible attenuation at the infrared range. It is also preferable to provide a hole or a recess in a substrate at the optical area of the interferometer.

22 Claims, 8 Drawing Sheets

MICROMECHANICAL TUNABLE FABRY-PEROT INTERFEROMETER AND A METHOD FOR PRODUCING THE SAME

TECHNICAL FIELD

The invention relates to a Fabry-Perot interferometer and a method for producing a Fabry-Perot interferometer. More specifically, the invention relates to tunable Fabry-Perot interferometers which are produced with micromechanical (MEMS) technology.

BACKGROUND TECHNOLOGY

Fabry-Perot interferometers are used as optical filters and in spectroscopic sensors, for example. A Fabry-Perot interferometer is based on parallel mirrors, whereby a Fabry-Perot cavity is formed into a gap between the mirrors. The pass band wavelength of a Fabry-Perot interferometer can be controlled by adjusting the distance between the mirrors i.e. the width of the gap. It is common to use micromechanical technology for producing Fabry-Perot interferometers. Such a solution is described e.g. in patent document FI95838.

Prior art structure of a micromechanical interferometer usually includes layers of silicon and silicon oxide or silicon nitride, wherein mirrors of the interferometer have silicon oxide layer(s) or silicon nitride layers between silicon layers. A movable mirror is provided by removing a sacrificial layer, which has initially been formed between two mirror layers. The sacrificial layer may be e.g. silicon dioxide, which can be removed by etching with hydrofluoric acid (HF), for example. In order to allow the etching substance to reach the sacrificial layer, holes are provided in the movable mirror. The position of a moveable a mirror is controlled by applying voltage to electrodes, which are included in the mirror structures.

The micromechanical production technology allows series production of interferometers. However, while the micromechanical interferometers of the prior art have good performance in short wavelength ranges of visible light and near-infrared radiation, whereas their performance is worse at the longer wavelengths i.e. infrared range, especially in the range over 5 µm. This is due to the fact that silicon oxide and silicon nitride have relatively high attenuation at these longer wavelengths.

A further disadvantage of the prior art interferometers relates to a requirement to use antireflection coating in order to compensate the refractive index of the substrate. The desired compensation can usually be achieved only within a restricted range of wavelengths, whereby the interferometers may not have the required performance on a wider range of wavelengths.

There may also exist problems if an aperture on the interferometer is provided by using a material layer which is deposited at the mirror side of the substrate. In such a case the mirror structure is not symmetric due to a step which is formed by the aperture layer, and as a result the mirror layers may not be straight.

SUMMARY OF THE INVENTION

The purpose of the present invention is to avoid or reduce disadvantages of the prior art.

The object of the invention is achieved with a solution, in which a gap is used as at least one layer of a mirror. The gap may be vacuum or it may include air or other gas which is transparent at the operational wavelength range. The further layers of the mirror are preferably made of polycrystalline silicon. The use of silicon oxide or silicon nitride in the mirror layers can thus be avoided or reduced. With this inventive solution it is possible to avoid the above mentioned problems related with the prior art.

Electrically tunable Fabry-Perot interferometer, comprising
 a substrate,
 a first mirror structure on the substrate,
 a second, movable mirror structure, whereby the first and second mirror structures comprise first and second mirrors which are substantially parallel,
 a Fabry-Perot cavity between the first and second mirrors,
 electrodes for electrical control of the distance between the mirrors, is characterised in that
 at least one mirror has a gap which serves as a layer of the mirror between two other layers of the mirror.

Method for producing a controllable Fabry-Perot interferometer, wherein
 a substrate is provided,
 a first mirror is provided on the substrate,
 a second, movable mirror structure is provided, whereby the first and second mirror structures comprise first and second mirrors which are substantially parallel,
 a Fabry-Perot cavity is provided between the first and second mirrors, whereby providing the cavity comprises providing a sacrificial layer between the first and second mirror structures before providing the second mirror structure, and the sacrificial layer is removed after providing the second mirror structure,
 providing electrodes for electrical control of the distance between the mirrors, is characterised in that
 a gap is formed in at least one mirror which gap serves as a layer of the mirror between two other layers of the mirror.

In one embodiment of the invention both mirrors of the interferometer have gaps which serve as layers of the mirror. According to another embodiment of the invention there are gap layers only in the movable mirror.

In one embodiment of the invention the optical aperture is produced by forming a hole or a recess in the substrate whereby the substrate may be heavily doped. Due to the heavy doping the substrate layer attenuates the radiation and prevents the transmission of radiation outside the optical aperture. It is also possible to provide an additional layer, such as a metal layer, at the surface of the substrate in order to prevent transmission of radiation outside the optical aperture. This feature of providing a recess or preferably a hole in the substrate at the optical area and providing an optical aperture can also be applied independently in such interferometers where mirror layers do not include a gap according to the present invention.

In another embodiment of the invention the substrate is made of transparent material, whereby a separate non-transparent material layer is used for forming the optical aperture. If the substrate is not removed at the optical area of the interferometer it is usually necessary to provide an antireflection material layer at the surface of the substrate within the optical area.

According to one embodiment of the invention the mirror layers at opposite sides of the gap are connected with necks through the gap in order to keep the gap width at a constant value throughout the optical area and in order to improve the mechanical strength and rigidity of the mirror. Such necks can be made of the same material as the layers at the opposite sides of the gap. Alternatively, the necks can be made of silicon oxide by remaining sacrificial silicon oxide to form the necks. The necks may have a form of a beam, for example.

The width dimensions of the neck are preferably smaller than or about the same size as the height of the neck. The necks are preferably perpendicular to the mirror planes.

Some further preferable embodiments of the invention are described in the dependent claims.

Significant advantages can be achieved with the invention when compared to the prior known solutions. In an inventive Fabry-Perot interferometer it is not necessary to use silicon oxide or silicon nitride layers in the mirror. Since polycrystalline silicon and air both have low attenuation in the infrared range wavelengths it is possible to provide interferometers which have good performance even within long wavelength ranges, such as 6-20 µm. It is also possible to use the interferometers according to the invention within shorter wavelength ranges.

Also, when silicon oxide is not used in the interferometer, the etching of the sacrificial layer does not deteriorate the mirror layers. It is therefore possible to remain straight edges of the holes which are made to the movable mirror for etching the sacrificial layer. The movable mirror thus keeps its even form. It is also possible to include a higher density of etching holes in the movable mirror, which improves the etching process and whereby HF vapour etching can be used. The etching holes are preferably distributed throughout a mirror, and the holes are more preferably evenly distributed across a mirror.

When the sacrificial layer is removed with HF vapour etching, this can be performed after cutting the chips and possibly also after encapsulating the chips. This allows simple cutting and packaging procedures because the movable mirror does not need to be released at that phase and is therefore not sensitive to environmental stress, such as changes of temperature or humidity, contamination, etc. Also, it is possible to transport the interferometers in normal transportation manners because the movable mirrors can be released after the transport.

Further, it is possible to allow a higher density of pinholes in the mirror layers because the etching agent is not harmful to any of the mirror layers. Therefore, it is possible to apply higher roughness at the mirror surfaces, whereby the risk of the mirrors sticking to each other is decreased. As a consequence of these advantages, higher yield can be achieved in the production of Fabry-Perot interferometers, and the high functional reliability of interferometers can be achieved.

There are also significant advantages related to providing a recess or preferably a hole at the substrate for forming an optical aperture. When substrate is not present at the optical area of the interferometer it is not necessary to provide a material layer, e.g. an antireflection layer, for compensating the refractive index of the substrate. This way it is possible to achieve a required performance of the interferometer within wide range of wavelengths. It is also possible to avoid an optical asymmetry between the mirrors. If there is a substrate layer at the optical area it is necessary to include an additional layer at the fixed mirror between the other layers of the mirror and the substrate, for matching the mirror with the substrate. As a result, there is a difference between the optical properties of the fixed mirror and the movable mirror. However, an optical symmetry is achieved when the substrate has been removed at the optical area because no additional layer for matching the mirror with a substrate is required. The fixed and movable mirrors can therefore be equal and have equal optical properties. As a further advantage, it is possible to provide a symmetrical mirror structure when an aperture layer is not required at the mirror side of the substrate. It is thus possible to get a better straightness of the mirror layers. Additionally, overall attenuation of the interferometer is reduced by removing the substrate at the optical area of the interferometer. It is noted that these advantages of removing the substrate at the optical area and possibly using the substrate for providing an optical aperture can at least in part be achieved also in interferometers where there is no gap as a mirror layer.

In this patent application the term "mirror" means a structure where there is a layer or a set of layers which reflects light.

In this patent application the terms "radiation" or "light" are used to mean any radiation in the optical range of wavelengths.

In this patent application "sacrificial layer" means a material layer which is at least partially removed in the final product.

SHORT DESCRIPTION OF THE DRAWINGS

In the following part the preferable exemplary embodiments of the invention are described in more detail by referring to the enclosed drawings, in which.

DETAILED DESCRIPTION OF THE EMBODIMENTS

Figure 1:
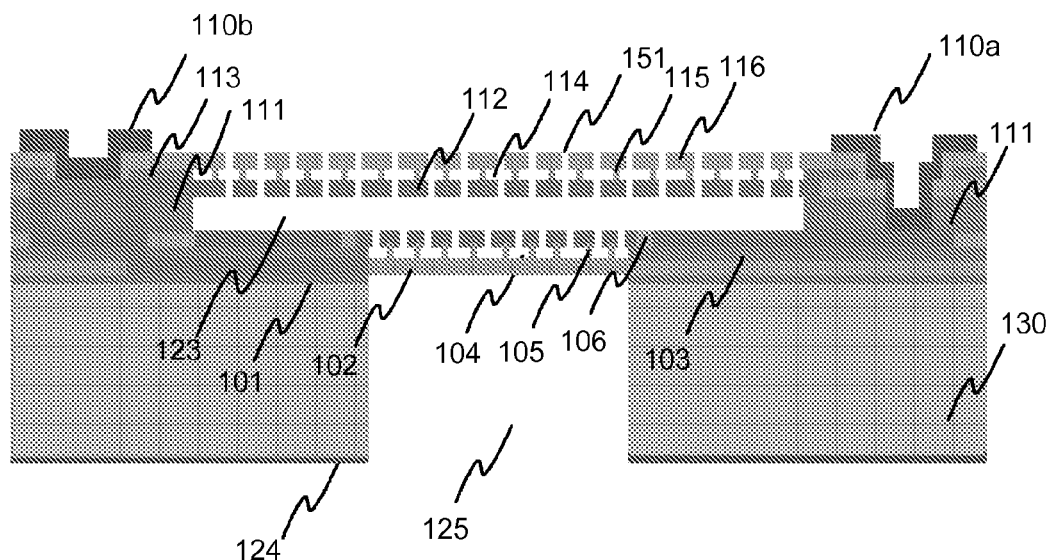
FIG. 1 illustrates a cross section of an exemplary Fabry-Perot interferometer according to the invention.

FIG. 1 illustrates a cross section of an exemplary Fabry-Perot interferometer according to the invention. The interferometer has a substrate 130 of e.g. monocrystalline silicon material, wherein there is a hole 125 at the optical area of the interferometer, thus providing an optical aperture for the interferometer. The reflecting layers of the fixed mirror are provided by layers 102-106, wherein layers 102 and 106 are of polycrystalline silicon, and layer 104 is a gap which includes vacuum, air or other transparent gas. The gap has been formed by removing a sacrificial layer of silicon oxide 103 from the optical area. Layer 106 is made of lightly doped polycrystalline silicon and serves as a control electrode of the fixed mirror.

The interferometer has a second, movable mirror which has reflecting layers 112-116. Layers 112 and 116 are of polycrystalline silicon, and layer 114 is a gap which includes vacuum, air or other transparent gas. The gap has been formed by removing a sacrificial layer of silicon oxide 113 from the optical area. Layer 112 is made of doped polycrystalline silicon and serves as electrically conducting control electrodes of the movable mirror.

The outer electrode of the lower, fixed mirror is electrically connected to the connection 110a. The electrode 112 of the movable mirror is connected to the same potential with the centre lower electrode, to the connection 110b. In this way it is possible to avoid a potential difference between the centre parts of the movable and fixed mirrors. If potential difference would exist, this could cause an uneven offset into the position of the centre part of the movable mirror. The electrical connections 110a, 110b are made of aluminium, for example.

There are necks 105, 115, in the gaps of mirror structures for keeping the width of the gap constant throughout the optical area. The necks connect the layers at the opposite sides of the gap mechanically to each other. The necks preferably cover only a small part, such as 1-10% of the optical area in order to avoid significant attenuation. The necks can be made of the same polycrystalline silicon material as the layers, or of silicon oxide, for example. One exemplary way to produce the necks of silicon is by patterning the silicon oxide layer before depositing a polycrystalline silicon layer, whereby the layers of polycrystalline silicon will be connected through the openings of the silicon oxide layer. One exemplary way to produce the necks of silicon oxide is by leaving sacrificial silicon oxide between the layers of polycrystalline silicon.

The value of the gap width of the mirrors is preferably $\lambda/4$, wherein $\lambda$ is the centre wavelength of the interferometer pass band. The optical thickness of the other mirror layers is preferably also $\lambda/4$. However, the gap width/optical thickness may alternatively be some multiple of $\lambda/4$.

The cavity of the interferometer is formed by the space 123, from which sacrificial silicon oxide layer has been removed. The sacrificial layer is etched e.g. by vapour HF through holes 151 of the second mirror structure. The second mirror will thus become movable. The silicon oxide layer has been removed from the optical area of the interferometer but it is not removed from the edges 111 of the silicon oxide layer. The remaining silicon oxide layer between the edges of the movable upper mirror and the lower fixed mirror serves as a support for the movable upper mirror. The silicon oxide keeps the movable mirror in a straight and uniform position. It is thus preferable to use the silicon oxide layer also as a support for the movable layer, but it is also a possible alternative to provide the support for the movable mirror by applying a supporting layer above and over the edges of the movable mirror. Such a support can be made of aluminium, for example.

There may be an optional patterned layer 124 of e.g. aluminium or some other material which does not transmit radiation within the operating range of the interferometer. The purpose of this layer is to prevent any radiation to be transmitted outside the aperture.

Figure 2:
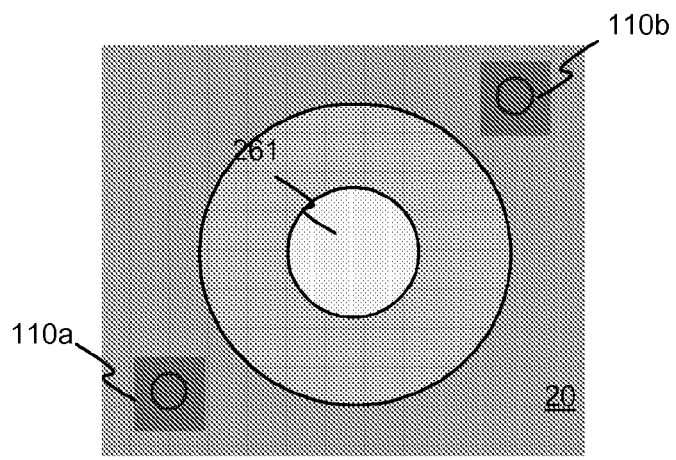
FIG. 2 illustrates a top view of an exemplary electrically tunable Fabry-Perot interferometer according to the invention.

FIG. 2 illustrates a top view of an exemplary electrically tunable Fabry-Perot interferometer 20 according to the invention. The contacts 110a and 110b for the electrodes of the upper and lower mirrors are located at corners of the interferometer. The optical area/aperture 261 is circular, and the upper, second mirror is provided with small holes (not shown) which have been used for removing the sacrificial layer. The holes are preferably evenly distributed across the optical area of the second mirror. The diameter of each hole may be e.g. 100 nm-5 µm. The holes may cover an area of 0.01%-5% of the optical area of the second mirror. Such holes function mainly as reflecting mirrors and do not therefore have substantial effect on the performance of the interferometer.

Figure 3:
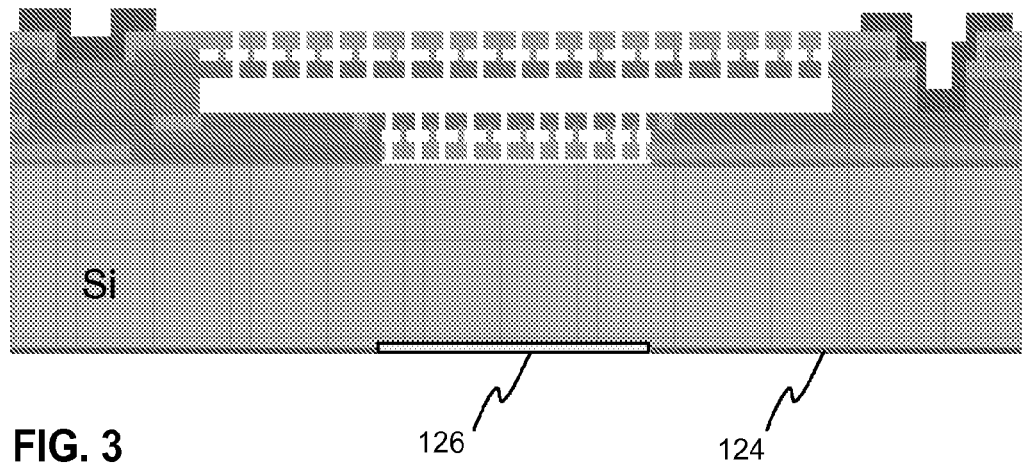
FIG. 3 illustrates a cross section of another exemplary Fabry-Perot interferometer according to the invention, wherein the substrate is transparent and without a hole at the optical area

FIG. 3 illustrates another embodiment of an interferometer according to the invention. In this embodiment the substrate is uniform, and the radiation passes through the substrate. The substrate must therefore be transparent at the operating wavelength range of the interferometer. The aperture is formed by a patterned layer 124 of e.g. aluminium or some other material which does not transmit radiation within the operating range of the interferometer. Layer 126 serves as an anti-reflective coating.

Figure 4:
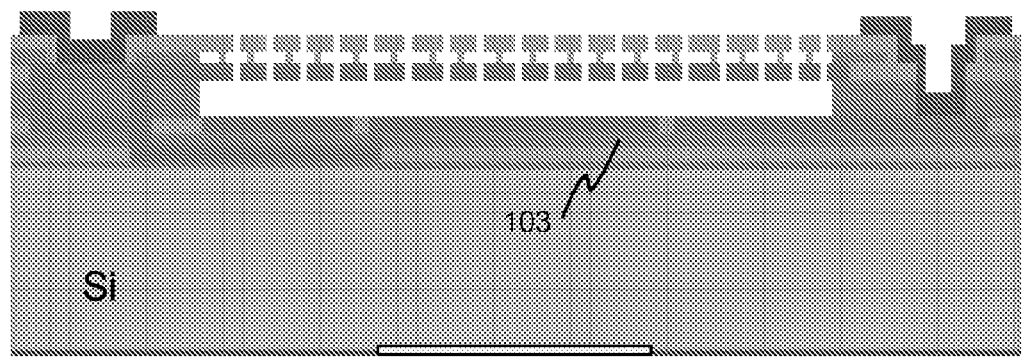
FIG. 4 illustrates a cross section of a further exemplary Fabry-Perot interferometer according to the invention, wherein only the movable mirror includes a gap forming a layer.

FIG. 4 illustrates a further embodiment of an interferometer according to the invention. In this embodiment the movable mirror has a gap as one layer, but the fixed, lower mirror has the middle layer 103 made of silicon oxide.

Figure 5:
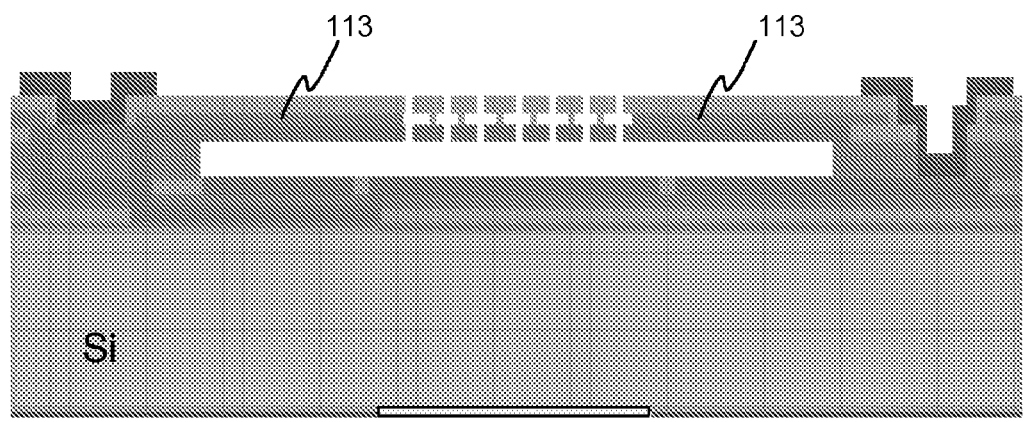
FIG. 5 illustrates a cross section of a further exemplary Fabry-Perot interferometer according to the invention, wherein the gap of the movable layer only covers the area of the optical aperture.

FIG. 5 illustrates a still further embodiment of an interferometer according to the invention. It is similar to the embodiment of FIG. 4 except in that the movable mirror has a gap only within the area of the aperture, whereby the mirror has a silicon oxide layer outside the aperture area.

Figure 6:
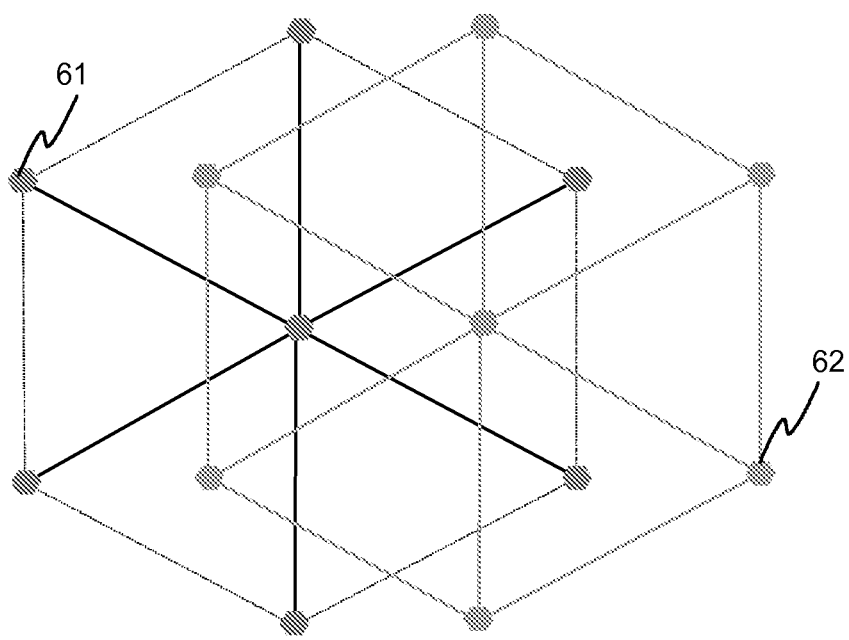
FIG. 6 illustrates preferable positioning of holes and necks at the layers of the movable mirror.
Figure 7A:
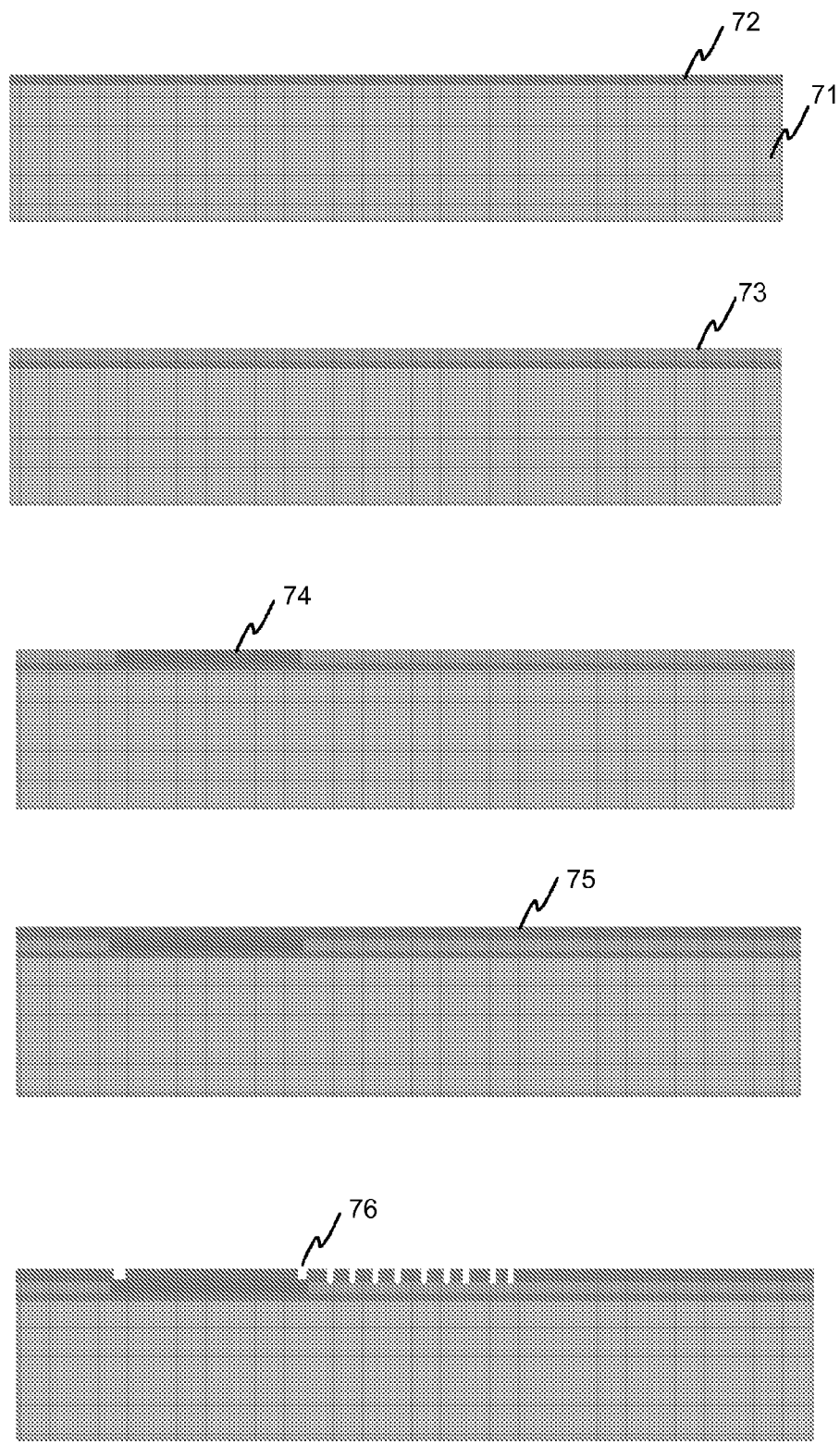
FIGS. 7a-7e illustrate an exemplary process for producing an exemplary Fabry-Perot interferometer according to the invention.
Figure 7B:
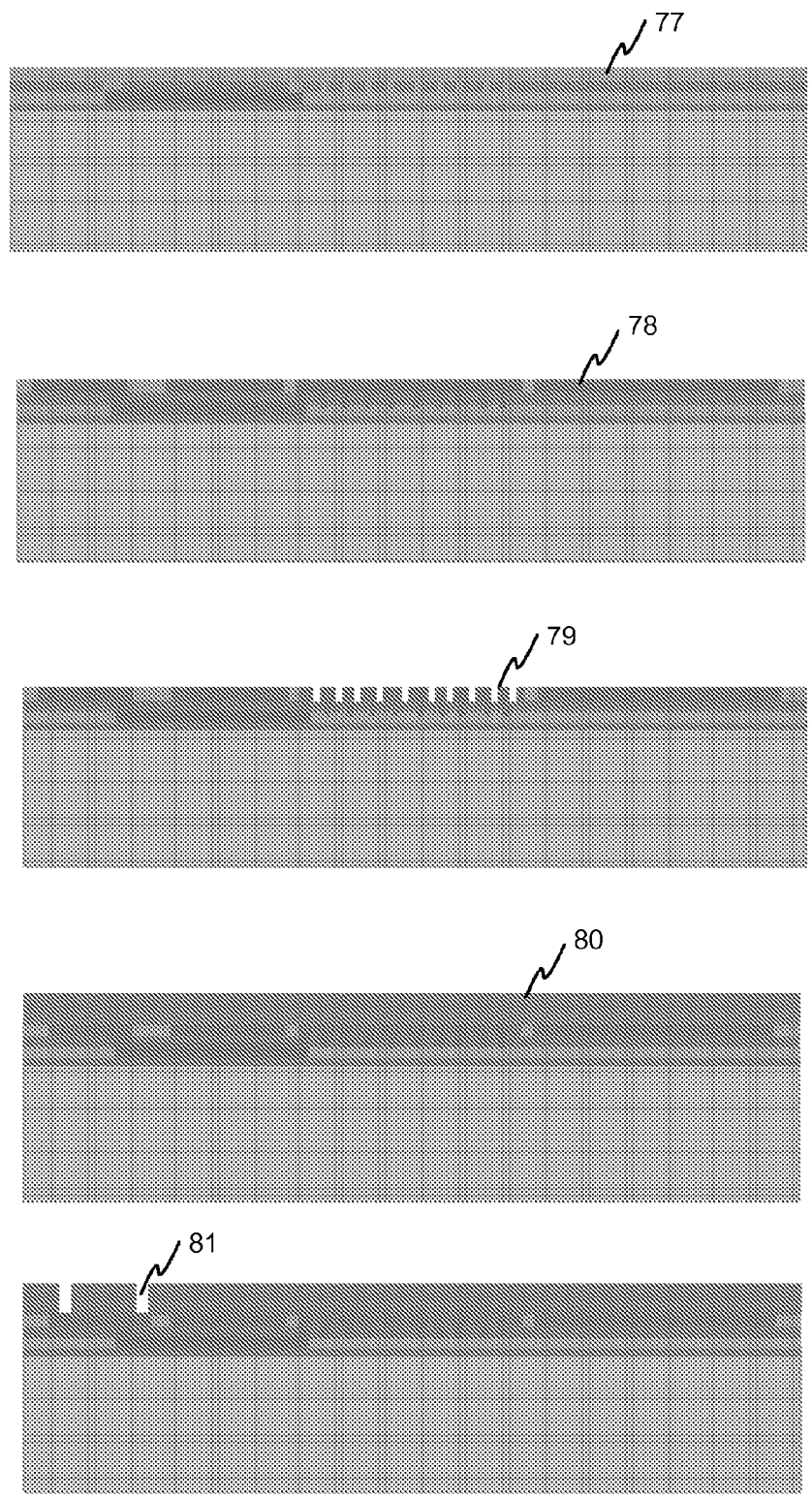
Figure 7C:
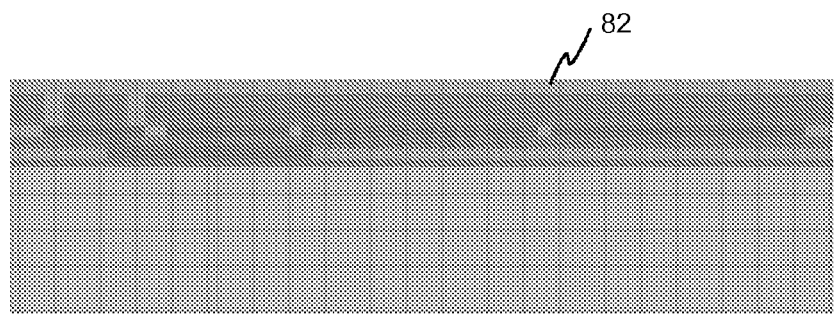
Figure 7C:
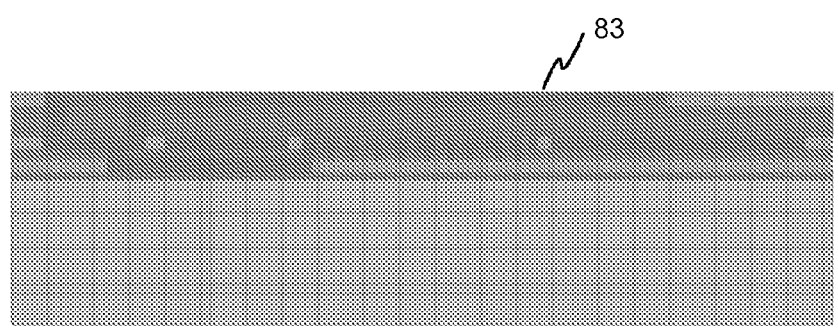
Figure 7C:
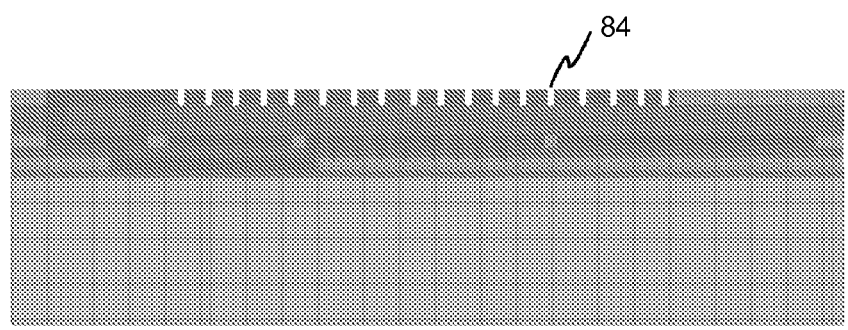
Figure 7C:
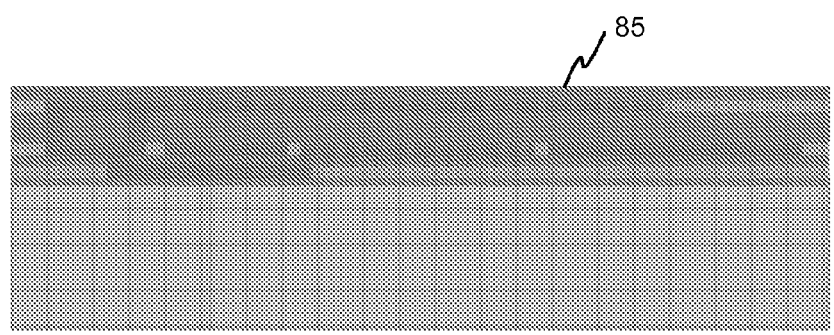
Figure 7D:
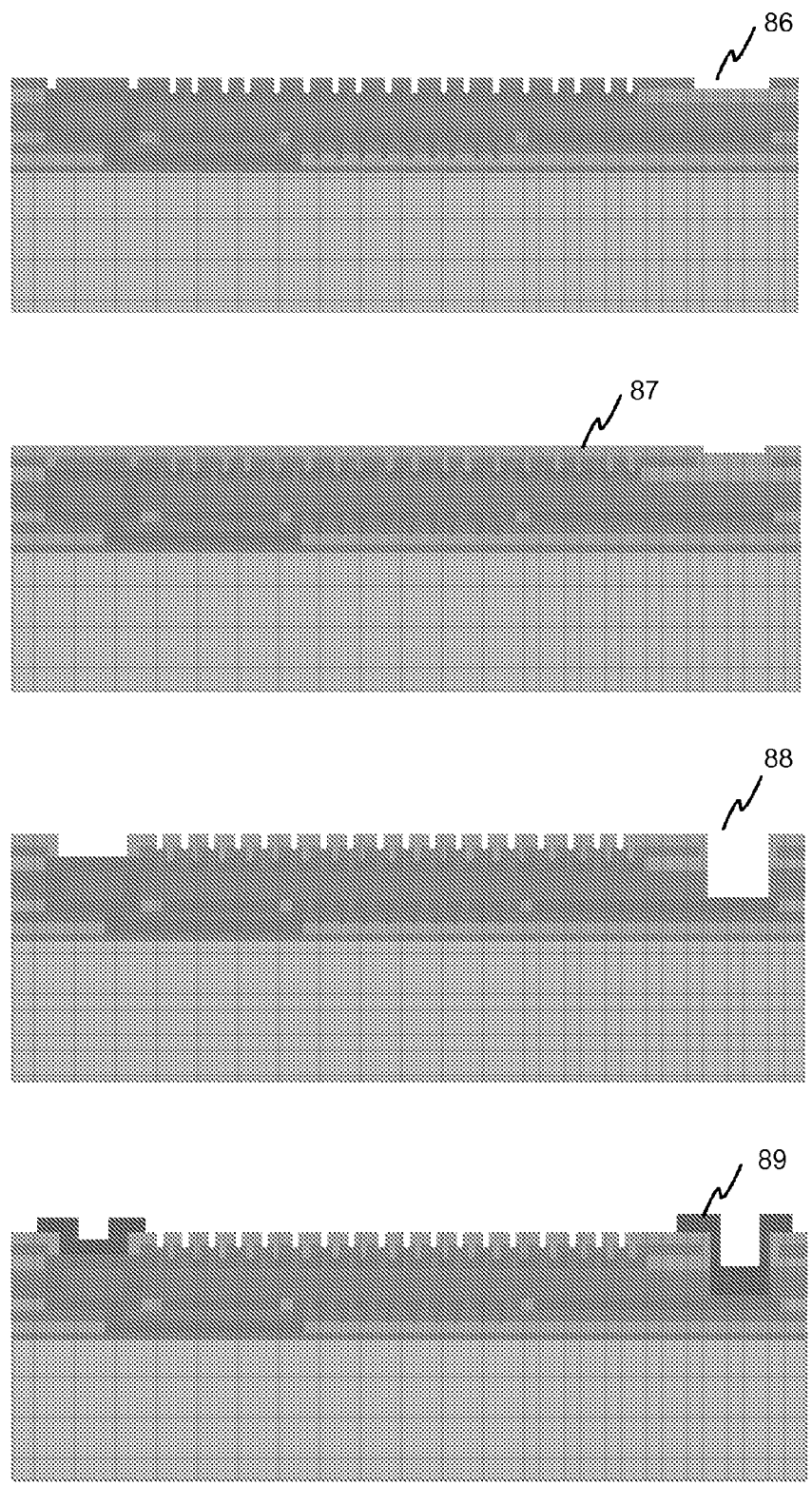
Figure 7E:
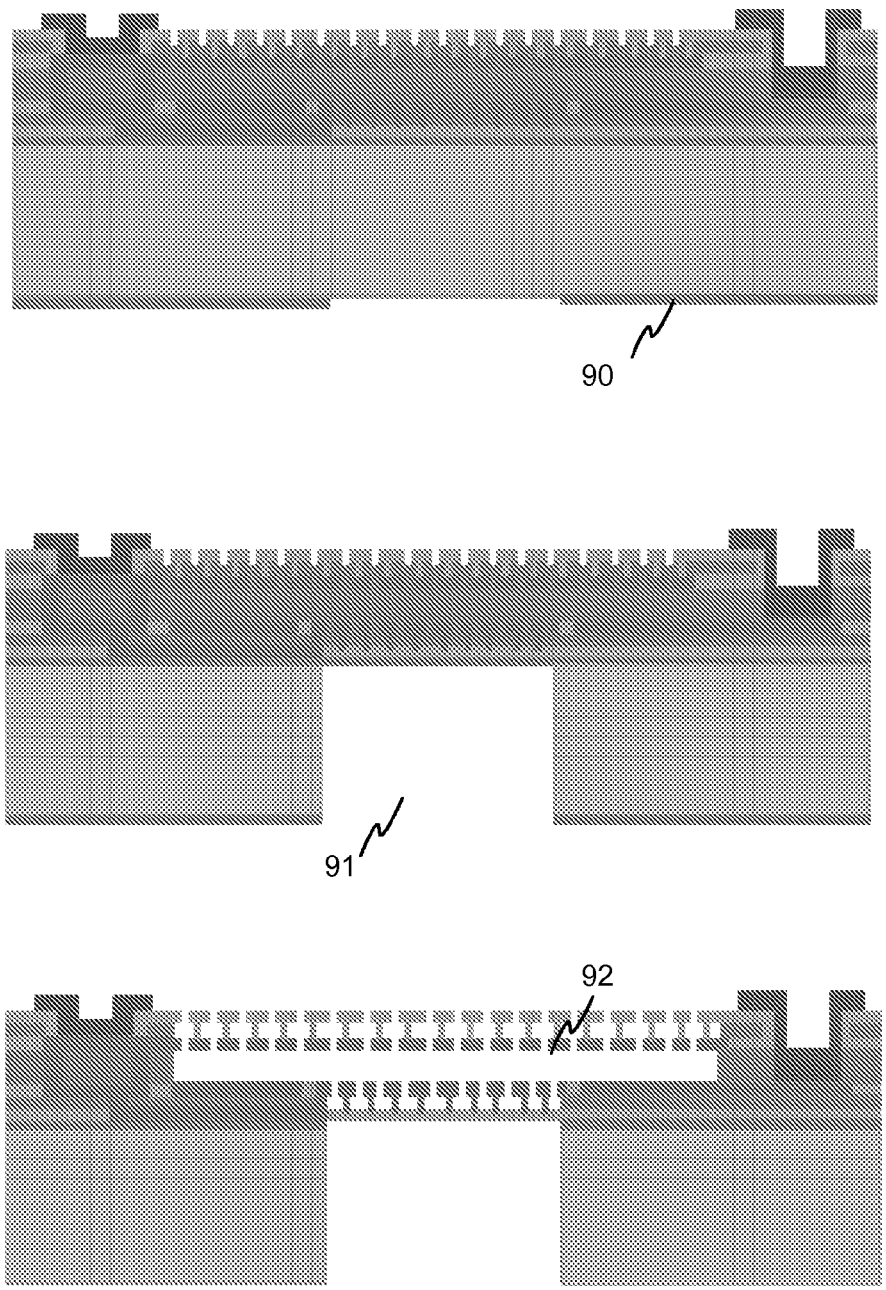

FIG. 6 illustrates a preferable relative positioning of holes 61 and necks 62 at the layers of the movable mirror. The holes are preferably positioned into a hexagonal grid in accordance with the FIG. 6.

FIGS. 7a, 7b, 7c, 7d and 7e illustrate a flow diagram of an exemplary method according to the invention for producing an electrically tunable Fabry-Perot interferometer, such as an interferometer of FIGS. 1 and 2. The production process is started by providing a wafer substrate, 71. The substrate can be e.g. monocrystalline silicon or fused silica. Next layers of the first, fixed mirror structure are provided on the substrate. A layer of silicon oxide is deposited on the substrate by LTO (Low temperature Oxidation) deposition, 72. Next, polycrystalline silicon is deposited, 73, and ion implantation and annealing is performed in order to achieve an electrically conductive area, 74. The next layer is deposited by low stress PECVD TEOS deposition, 75, which is then patterned, 76. Next a polycrystalline silicon layer is deposited, 77, and conductive areas are formed by ion implantation and annealing, 78. The polysilicon is then patterned, 79. Thus the layers for the fixed mirror have been produced.

A sacrificial layer for forming a Fabry-Perot cavity is deposited by PECVD TEOS deposition, 80, and the layer is patterned, 81. Next, the layers for the movable mirror are produced. A layer of polycrystalline silicon is deposited, 82, conductive areas are formed by ion implantation and annealing, 83, and the layer is patterned, 84. Next a layer is made with PECVD TEOS deposition, 85, and the TEOS oxide is patterned, 86. A layer of polycrystalline silicon is formed with LPCVD deposition, 87, and the oxide is wet etched, 88. Thus the layers for the movable mirror have been produced.

Metallization with aluminium is performed for the connectors by sputtering and patterning, 89. Next, a silicon oxide layer is deposited and patterned at the backside of the interferometer, 90. By ICP etching of silicon a hole/recess is made to the substrate, 91. Finally, the interferometer chips are diced, and the sacrificial layer is vapor etched, 92.

The invention has been described with the reference to the enclosed embodiments. It is, however, clear that the invention is not restricted only to those, but it comprises all embodiments which can be imagined within the inventive idea and the enclosed patent claims.

For example, some materials, dimensions and forms have been mentioned as examples for implementation of the invention. However, it is clear that dimensions, forms and materials as well as details of structure or phases of production can be changed and optimised for each implementation according to the specific requirements.

Above, the use of aluminium was described as a conductive material forming electrodes electrical wiring and connections. However, it must be noted that it is quite possible to use other alternatives of conductive materials, such as copper. Also, monocrystalline silicon has been mentioned as an exemplary preferable material for the substrate. However, it is naturally possible to use other alternative materials.

It is also noted that the feature of removing the substrate at least partly at the optical area and possibly using it for providing an optical aperture can also be applied as an independent invention in structures which do not include a gap as a mirror layer, but where all mirror layers are e.g. deposited material layers.

The inventive interferometers have several preferable applications. They can be used as controllable filters in optical spectrometers, colour analyzers, imagers, optical data communications, and in various devices for measuring e.g. contents of specific gases or liquids.

The invention claimed is:

1. An electronically tunable Fabry-Perot interferometer, comprising
    a substrate including a portion defining an optical area;
    a first mirror structure on the substrate;
    a second, movable mirror structure, whereby the first and second mirror structures define respective first and second mirrors which are substantially parallel to each other, and each of the first and second mirrors extend along the optical area;
    a Fabry-Perot cavity between the first and second mirrors;
    electrodes for electrical control of the distance between the mirrors;
    at least one mirror including oppositely disposed mirror layers with an intermediate a gap between the oppositely disposed mirror layers, the gap defining an intermediate mirror layer between the oppositely disposed mirror layers; and,
    a plurality of necks extending between the oppositely disposed mirror layers, in the intermediate mirror layer, the necks for maintaining a constant width of the gap defining the intermediate mirror layer, the necks dimensioned to minimize attenuation of the interferometer.

2. The electronically tunable Fabry-Perot interferometer according to claim 1, wherein the gap is between two layers of polycrystalline silicon.

3. The electronically tunable Fabry-Perot interferometer according to claim 1, wherein the second, movable mirror includes a gap.

4. The electronically tunable Fabry-Perot interferometer according to claim 1, wherein the first mirror includes a gap.

5. The electronically tunable Fabry-Perot interferometer according to claim 1, wherein the width of the gap is $\lambda/4$, wherein $\lambda$ is the centre wavelength of the pass band of the interferometer.

6. The electronically tunable Fabry-Perot interferometer according to claim 1, wherein the optical thickness of all layers of the mirror is $\lambda/4$, wherein $\lambda$ is the centre wavelength of the pass band of the interferometer.

7. The electronically tunable Fabry-Perot interferometer according to claim 1, wherein the substrate has a hole or recess at the optical area of the interferometer.

8. The electronically tunable Fabry-Perot interferometer according to claim 7, wherein the substrate is substantially non-transparent at the operational wavelength of the interferometer thus forming an optical aperture.

9. The electronically tunable Fabry-Perot interferometer according to claim 7, wherein there is a coating on the substrate, the coating being substantially non-transparent at the operational wavelength of the interferometer thus forming an optical aperture.

10. The electronically tunable Fabry-Perot interferometer according to claim 1, wherein the substrate is of transparent material at the operational wavelength range of the interferometer, and the interferometer has a separate layer for forming an optical aperture.

11. The electronically tunable Fabry-Perot interferometer according to claim 1, wherein the gap has a vacuum or that the gap includes air or other gas which is transparent at the operational wavelength range of the interferometer.

12. The electronically tunable Fabry-Perot interferometer according to claim 1, wherein a mirror of the interferometer has etching holes, which are preferably distributed throughout the mirror.

13. A method for producing a controllable Fabry-Perot interferometer, comprising:
    providing a substrate including a portion defining an optical area;
    providing a first mirror on the substrate;
    providing a second, movable mirror structure, whereby the first and second mirror structures define respective first and second mirrors which are substantially parallel to each other, and the first and second mirrors extend along the optical area;
    providing a Fabry-Perot cavity between the first and second mirrors, whereby providing the Fabry-Perot cavity comprises providing a sacrificial layer between the first and second mirror structures before providing the second mirror structure, and the sacrificial layer is removed after providing the second mirror structure;
    providing electrodes for electrical control of the distance between the mirrors, at least one of the mirrors is formed of oppositely disposed mirror layers with a gap between the oppositely disposed mirror layers, the gap defining an intermediate mirror layer between the oppositely disposed mirror layers; and,
    positioning a plurality of necks to extend between the oppositely disposed mirror layers, in the intermediate mirror layer, the necks for maintaining a constant width of the gap defining the intermediate mirror layer, the necks dimensioned to minimize attenuation of the interferometer.

14. The method according to claim 13, wherein the mirror is made of at least two layers of polycrystalline silicon, whereby the gap is formed between two said layers of polycrystalline silicon.

15. The method according to claim 13, wherein a gap is made into the second, movable mirror.

16. The method according to claim 13, wherein a gap is made into the second, movable mirror.

17. The method according to claim 13, wherein the gap is formed to have a width of $\lambda/4$, wherein $\lambda$ is the centre wavelength of the pass band of the interferometer.

18. The method according to claim 13, wherein all layers of the mirror are formed to have an optical thickness of $\lambda/4$, wherein $\lambda$ is the centre wavelength of the pass band of the interferometer.

19. The method according to claim 13, wherein the gap is made to have a vacuum or to include air or other gas which is transparent at the operational wavelength range of the interferometer.

20. The method according to claim 13, wherein a hole or a recess is made in the substrate at the optical area of the interferometer in order to form an optical aperture.

21. The method according to claim 13, wherein a hole or a recess is made in the substrate at the optical area of the interferometer, and a non-transparent material layer is provided on the substrate in order to form an optical aperture.

22. The method according to claim 13, wherein etching holes are made through a mirror, the etching holes being preferably distributed throughout the mirror.

\* \* \* \* \*